(No Model.) 2 Sheets—Sheet 1.
H. REA.
COMBINED HARROW, RAKE, AND TRUCK.

No. 539,303. Patented May 14, 1895.

Witnesses
F. M. Johnson
W. H. Pumphrey

Inventor
Hugh Rea
Geo. H. Holgate
His Attorney (No Model.) 2 Sheets—Sheet 2.

H. REA.
COMBINED HARROW, RAKE, AND TRUCK.

No. 539,303. Patented May 14, 1895.

Witnesses
F. M. Johnson.
W. H. Humphrey.

Inventor
Hugh Rea
By Geo. H. Holgate
his Attorney

UNITED STATES PATENT OFFICE.

HUGH REA, OF VILLAGE GREEN, PENNSYLVANIA.

COMBINED HARROW, RAKE, AND TRUCK.

SPECIFICATION forming part of Letters Patent No. 539,303, dated May 14, 1895.

Application filed February 6, 1895. Serial No. 537,496. (No model.)

*To all whom it may concern:*

Be it known that I, HUGH REA, a citizen of the United States, residing at Village Green, in the county of Delaware and State of Pennsylvania, have invented certain new and useful Improvements in a Combined Harrow, Rake, and Truck, of which the following is a specification.

My invention relates to a combined harrow, rake and truck.

The object of the invention is to provide a harrow with teeth arranged in a manner, whereby, upon turning the teeth about their pivot, to a slight degree, the harrow will serve as a rake or truck, as may be required; and, further, to secure the draft chains to the harrow so as to cause it to become a self-dumping harrow, rake or truck.

To these ends the invention consists in an improved construction and combination of parts, which will be hereinafter described and claimed.

Figure 1:
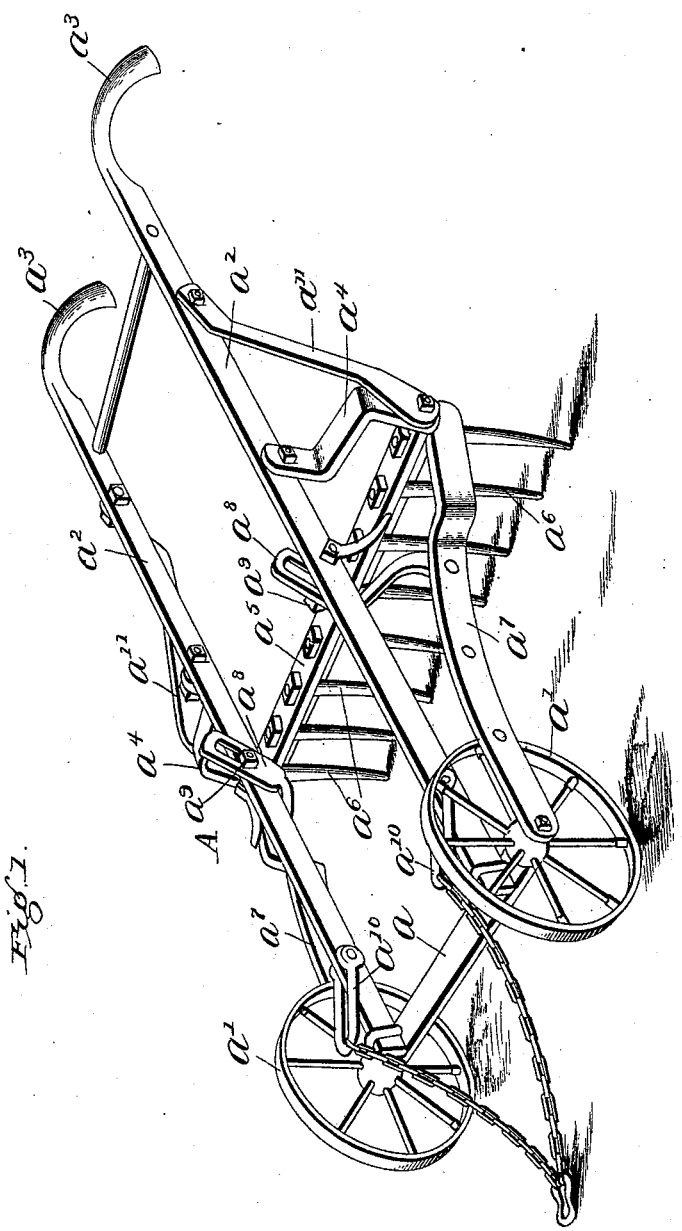
Figure 2:
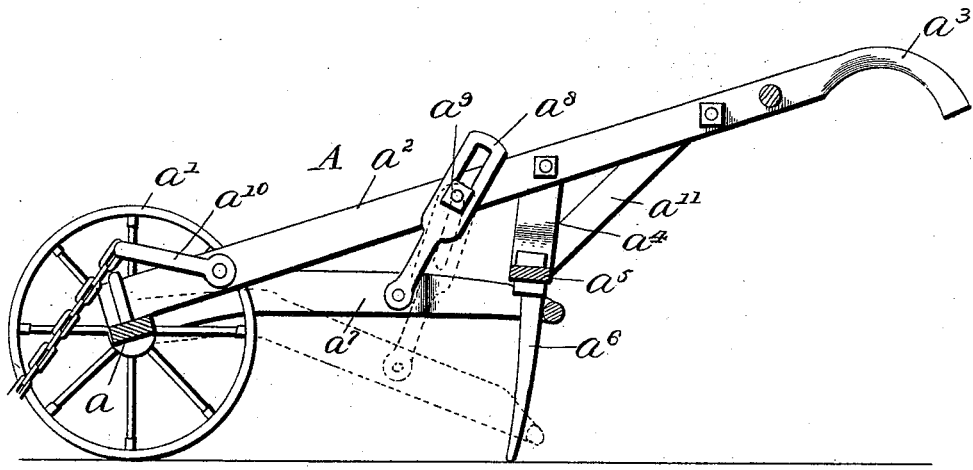
Figure 3:
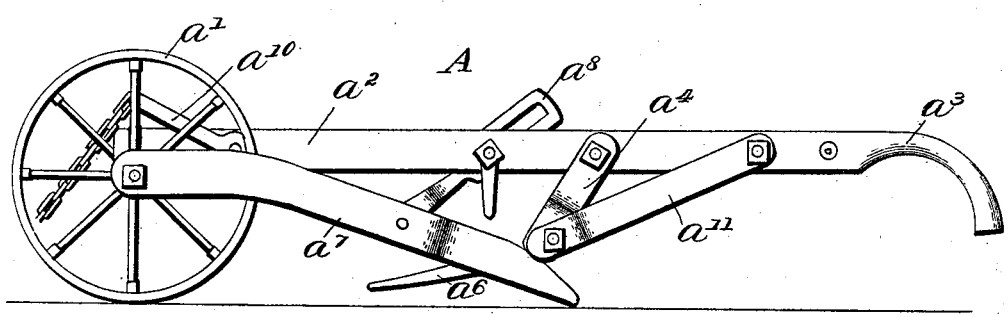

In the accompanying drawings, forming part of this specification, in which similar letters of reference indicate corresponding parts in all the views, Figure 1 is a view in perspective of one embodiment of the invention, which is arranged to serve as a harrow. Fig. 2 is a sectional view of the same; and Fig. 3 is a view in elevation, showing the machine arranged to be used as a rake or truck.

In the drawings, A, designates the harrow, and $a$, the axle thereof, to which are attached wheels $a'$. Pivotally upon the axle are two rearwardly extending arms $a^2$, which terminate at their rear ends in handles $a^3$. Mounted between brackets or hangers $a^4$, depending from the arms $a^2$, is a bar $a^5$, to which are secured the teeth $a^6$, which at the lowest point of adjustment, extend downward a sufficient distance to enable them to enter and harrow the ground in a thorough and satisfactory manner.

Upon the outer ends of the axles A, rearwardly extending braces or arms $a^7$, are mounted and connected together at the rear of the tooth bar, to serve as a guard. Attached to these arms $a^7$, at a suitable distance in advance of the teeth, are slotted adjusting arms $a^8$, the slotted ends being held by bolts $a^9$, projecting from the arms $a^2$, as is clearly shown in Fig. 1. By this construction, it will be seen, that the depth to which the teeth enter the ground, can be regulated by setting the guard at the desired height, the guard being adapted to travel over the ground above the points of the teeth. To the arms $a^2$, in the rear of the axle A, are pivotally secured chain clips $a^{10}$, to which the chains are attached for drawing the harrow. Braces $a^{11}$, serve to additionally brace the harrow bar.

By a proper adjustment of the guard, the ground can be broken to any required depth. Also, to change the device from a harrow to a rake, it will only be necessary to raise the guard and throw the harrow teeth downward a sufficient distance, when the guard will rest on the ground, the teeth passing over it and acting as a rake. By raising the handle $a^3$, a suitable distance, the rake will become elevated sufficiently to cause it to dump, by the pulling of the draft animals on the chains, this result being effected by securing the chain clips in the rear, above the axle. For use as a truck, the handles are elevated to enable the guard and harrow teeth to pass over the ground without engaging it.

The advantages of this construction are many, but it is not thought necessary to enumerate them, as they will be at once apparent from the foregoing description.

Having thus described my invention, what I claim as new is—

1. In a harrow, the combination with an axle, wheels and handle bars, of a toothed bar pivotally mounted in brackets secured to the said handle bars, and a guard pivotally attached to the axle and adapted to regulate the cutting depth of the teeth, for the purpose described.

2. The combination with an axle, wheels pivotally secured thereto, of handle bars pivotally attached to the top of the axle and having teeth pivotally connected therewith, and chain clips pivotally secured to the handle bars at a point above and in rear of the connecting points of the handle bars and the axle, for the purpose described.

3. In a harrow, the combination with an axle, wheels, handle bars, and a harrow tooth bar pivotally secured to said handle bars, of a guard pivotally mounted on said axle and extending to the rear of said harrow teeth, the movement of said guard being adjustably regulated by means of slotted brackets pivotally secured to the guard and to bolts mounted on the handle bars, for the purpose described.

In testimony whereof I have hereunto affixed my signature in the presence of two subscribing witnesses.

HUGH REA.

Witnesses:
MILTON H. BICKLEY,
M. H. BICKLEY.